Jan. 2, 1951 J. W. HODGKISS 2,536,809
ELECTRIC PROTECTIVE SYSTEM
Filed July 20, 1949
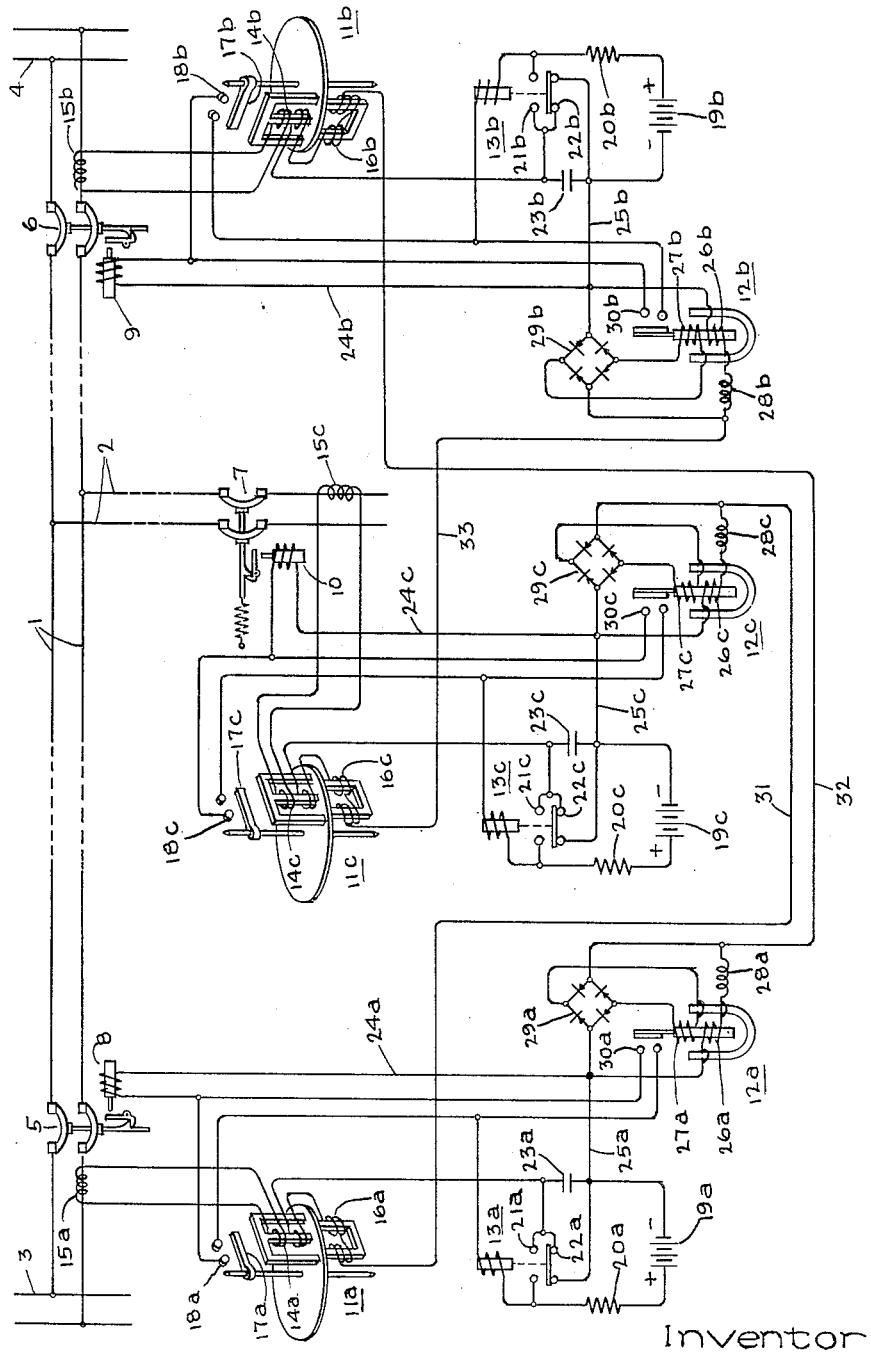
Inventor:
James W. Hodgkiss,
by Ernest C. Britton
His Attorney.

Patented Jan. 2, 1951

2,536,809

UNITED STATES PATENT OFFICE 2,536,809

ELECTRIC PROTECTIVE SYSTEM

James W. Hodgkiss, West Timperley, Altrincham, England, assignor to General Electric Company, a corporation of New York Application July 20, 1949, Serial No. 105,788
In Great Britain August 26, 1948

4 Claims. (Cl. 175—294)

This invention relates to electrical unbalance protective systems and more particularly to a protective-relaying system of the pilot-wire type wherein direct current is injected into the electrical unbalance pilot-wire circuit for controlling the circuit interrupters located at a plurality of the terminals of an alternating current electric power system.

In known electric systems of the pilot-wire type, a protective relay is located respectively at each terminal of the protected line section and such relays are interconnected by pilot wires in order to provide for operation in response to unbalanced electrical conditions. Under normal load conditions or when a fault external to the protected section occurs, the power-system current flowing through each terminal bears a predetermined relationship to the current flowing through the other terminal or terminals of the system. Electrical quantities derived from the power-system current at each terminal, when supplied to the pilot-wire network, can be arranged in a balanced relationship so that no appreciable current flows in the pilot wires when an external fault occurs. When an internal fault occurs, an unbalanced condition develops between the electrical quantities derived at the various system terminals. This unbalanced condition in known arrangements will cause operation of the protective relay located at at least one of the system terminals thus causing disconnection of the associated circuit interrupter. The protective relay at another of the terminals of the protected section might not operate because the current flowing through the system conductors at such terminal may be too small to cause operation of the corresponding protective relay. Accordingly, it has been the practice to utilize the protective relay which operates during an internal fault for the purpose of injecting a direct current into the pilot wires. This injected current causes operation of polarized receiving relays located at the terminals whose protective relays do not operate. Operation of the receiving relays causes tripping of their associated interrupters. Since the current injected is direct current, it is necessary to use two polarized receiving relays at each terminal so that response can be obtained for direct current injected into the pilot wires from either of two directions in presently known arrangements.

It is an object of my invention to provide a protective system of the pilot wire direct current injection type which utilizes only one receiving relay at each of the system terminals.

Another object of my invention is to provide a protective arrangement for pilot wire protective systems of the direct current injection type which is applicable to a protected section having any number of terminals.

In accordance with my invention, I eliminate one of the direct current receiving relays normally required in arrangements of the direct current injection type and provide a protective system which can be used for any number of terminals by connecting the operating windings of the polarized receiving relays in series circuit relationship so that a direct current of predetermined direction of flow which is injected into the line at any terminal will cause simultaneous operation of all of the receiving relays.

One form of my invention is embodied in the three terminal system represented by the single feature of the drawing. For purposes of simplicity, I have shown a single phase power system but it will be understood that my invention is equally applicable to a poly phase power system.

With reference to the drawing, the protected portion of the system comprises the line sections 1 and 2 arranged in a T-connection. Line section 1 interconnects buses 3 and 4. Circuit breakers 5 and 6 are provided for isolating line section 1 from the buses 3 and 4. The circuit breaker 7 is for the purpose of disconnecting line section 2 from its source or feeder line. Circuit breakers 5, 6 and 7 are shown schematically as being of the biased-opened latch-closed type which are operated respectively by trip coils 8, 9 and 10.

The protective system associated with the terminal controlled by circuit breaker 5 comprises a fault responsive protective relay 11a, a polarized receiving relay 12a and an injection relay 13a. The corresponding relays associated with the line terminals controlled by circuit breaker 6 are given the designations 11b, 12b and 13b while the corresponding relays associated with the line terminal controlled by circuit breaker 7 are given the designations 11c, 12c, and 13c. Since the relays and their circuits are the same for each terminal the same numerals will be used to designate the corresponding components. The letters "a," "b" and "c" will be used in conjunction with the appropriate numeral to designate the components for the terminals controlled by interrupters 5, 6 and 7 respectively. Relay 11a is provided with a primary winding 14a which is energized by current transformer 15a, the primary of which is connected in series with one of the conductors comprising line section 1. The relay 11a is provided with a secondary winding 16a. As will be more fully explained hereinafter, the windings 16a, 16b and 16c are all connected in series circuit relationship with the voltages generated therein in opposition. Under normal conditions, no appreciable amount of current flows in the windings 16a, 16b and 16c or in the pilot wires which interconnect these windings. An unbalanced condition, such as could be caused by an internal fault, will cause a current to flow in the circuit comprising the windings 16a, 16b, 16c and the pilot wires. Relay 11a is also provided with an element 17a which is movable when a predetermined current flows through the windings 16a and 14a. Movable element 17a controls contacts 18a of the relay 11a.

The injection relay 13a is operable in response to operation of the contacts 18a of fault responsive relay 11a. Associated with the injection relay 13a is a source of direct current potential indicated at 19a and in series with the battery 19a is a current limiting resistor 20a. The relay 13a is provided with normally opened contacts 21a and normally closed contacts 22a and a suitable arc inhibiting device may be connected in parallel circuit relationship with the contacts 22a as indicated at 23a.

Trip coil 8 is operated when relay 11a operates because of the completion of a circuit comprising the positive terminal of battery 19a, resistor 20a, the coil of relay 13a, contacts 18a of relay 11a, trip coil 8, conductors 24a and 25a and the negative terminal of battery 19a. Thus, operation of relays 11a, 11b and 11c causes opening of circuit breakers 5, 6 and 7 respectively.

Since a fault condition which is internal may cause sufficient current to flow through the winding 14b of relay 11b for example, but not enough current to flow through the windings 14a and 14c of relays 11a and 11c to operate the relays 11a and 11c, it is necessary to provide means for positively opening circuit breakers 5 and 7 when circuit breaker 6 is caused to open. To this end, each of the terminals is provided with a polarized receiving relay such as 12a, 12b and 12c which will operate in response to operation of any of the injection relays such as relays 13a, 13b and 13c. Relay 12a is provided with an operating winding 26a and a restraining winding 27a. Operating winding 26a is arranged in series with a suitable choke coil 28a. Because the pilot wire may receive a high induced voltage due to the proximity of the protected line sections 1 and 2, for example, the choke coil 28a is effective to immunize winding 26a against alternating or surge currents. The restraining winding 27a is energized by a rectifier arrangement 29a, the alternating current terminals of which are connected in parallel with the operating winding 26a and its associated choke coil 28a. Direct current output of the rectifier 29a is supplied to the restraining winding 27a. Relay 12a is provided with normally opened contacts 30a which are closed in response to the flow of a predetermined direct current through the operating winding 26a.

Each of the receiving relays is effective to cause tripping of its associated circuit breaker. For example, relay 12c will close its contacts 30c when an appropriate direct current signal is received from battery 19a or 19b. Closing of the contacts 30c of the relay 12c places battery 19c across the trip coil 10 by completing a circuit through conductors 25c and 24c, contacts 30c, the coil of relay 13c and resistor 20c to cause a tripping operation of circuit breaker 7.

From the drawing, it can be observed that the relays 11a, 12a and 13a are connected with the corresponding relays associated with the terminals controlled by circuit breakers 6 and 7 by pilot wires 31, 32 and 33 which form a series circuit into which the batteries 19a, 19b and 19c can be inserted upon operation of any one of the protective relays and the resulting operation of the associated injection relay. The polarity of the batteries 19a, 19b and 19c is such that their voltages would be additive so that only one polarized receiving relay need be used at each terminal. The resistors 20a, 20b and 20c are chosen with resistance values such that the voltage would not be excessive should more than one of the batteries 19 be injected into the circuit at one time.

Should a fault condition develop on line section 1, for example, which would cause operation of protective relay 11a but which would not cause operation of relays 11b and 11c, the coil of relay 13a would be energized upon closing of the contacts 18a. Since a circuit would be completed between the positive terminal of battery 19a, resistor 20a, the coil of relay 13a, contacts 18a, trip coil 8 and conductors 24a and 25a as already explained. This would result in opening of circuit breaker 5 and closing of contacts 21a of relay 13a. Upon closing of contacts 21a, a circuit would be completed through the coil 16a, contacts 21a, resistor 20a, battery 19a, conductor 25a, operating winding 26a of relay 12a, pilot wire 32, coil 16b of relay 11b, contacts 22b of relay 13b, conductor 25b, coil 26b of relay 12b, pilot wire 33, coil 16c of relay 11c, contacts 22c, conductor 25c, coil 26c, and pilot wire 31 to the coil 16a of relay 11a. This series circuit would cause operation of relays 12b and 12c and closing of their contacts 30b and 30c would energize the trip coils 9 and 10 respectively. Thus, operation of relay 11a would, for example, cause operation of relay 13a which in turn would cause battery 19a to inject a direct current potential in a series circuit comprising the operating windings 26b and 26c of receiving relays 12b and 12c. Energization of these windings would result in the opening of circuit breakers 6 and 7 almost immediately after opening of circuit breaker 5 upon the occurrence of an internal fault within the protected portion of the power system. Likewise, operation of relays 11b and 11c would cause operation of interrupters 5, 6 and 7.

Because the polarized receiving relays 12a, 12b and 12c are connected in series with each other and because the potentials of the batteries 19a, 19b, and 19c are additive, it is only necessary to use one receiving relay at each of the system terminals. Furthermore, it will be obvious that the protective arrangement comprising my invention is not limited to three terminals as shown but could be extended to an indefinite number of terminals.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. A protective arrangement for an alternating current electric power system having a plurality of terminals comprising an electrical unbalanced protective relay at each terminal having an alternating current response winding connected in a series pilot circuit with the alternating current response windings of the protective relays at the other terminals for performing a predetermined control operation when an unbalanced electrical condition develops, a polarized receiving relay disposed at each terminal end of the system for independently performing the predetermined control operation of the corresponding protective relay, each of said receiving relays having an operating winding, means including a rectifier for interconnecting the operating windings of said receiving relays in the series pilot circuit to be unresponsive to alternating current therein, a source of direct current potential at each terminal, and switching means controlled by the unbalanced protective relay at each terminal for inserting the corresponding source of direct current potential in the series pilot circuit to energize the operating winding of all of said polarized receiving relays upon operation of the unbalanced protective relay in response to the occurrence of an unbalanced alternating current condition within the system.

2. A protective arrangement for an alternating current electric power system having a plurality of terminals comprising a polarized receiving relay at each terminal of the system for performing a predetermined control operation, each of said relays having an operating winding, means for interconnecting the operating windings of said relays in a series circuit, an unbalanced alternating current responsive relay at each terminal for performing the predetermined control function of the corresponding polarized receiving relay when a predetermined alternating current unbalanced condition develops and each having an operating winding connected in the series circuit, a source of direct current potential at each terminal, and switching means controlled by the unbalanced alternating current responsive relay at each terminal upon response thereof for inserting the corresponding source of direct current potential in the series circuit for supplying current to the operating windings of all of said polarized relays.

3. A protective arrangement for an alternating current electric power system having a plurality of terminals comprising a polarized relay at each terminal of the system for performing a predetermined control operation, means including a two-wire pilot circuit for interconnecting said polarized relays in series, an alternating current unbalanced responsive relay at each terminal of the system having an operating winding connected in the two-wire pilot circuit, a source of direct current potential at each terminal of the system, and switching means controlled by each alternating current unbalanced responsive relay upon response thereof for inserting the corresponding source of direct current potential in the two-wire pilot circuit for causing a direct current to flow in a predetermined direction through all of said polarized relays.

4. A protective arrangement for an alternating current electric power system having a plurality of terminals comprising a polarized relay at each terminal of the system for performing a predetermined control operation, an alternating current unbalanced responsive relay at each terminal of the system operable in response to a predetermined system unbalanced condition, a two-wire pilot circuit interconnecting predetermined windings of said polarized relays and said unbalanced responsive relays in series circuit relationship, a source of direct current potential at each terminal and an injection relay located at each terminal which is controlled by the corresponding one of the unbalance responsive relays and provided with switching means for inserting the corresponding source of direct current potential in the two-wire pilot circuit to cause a direct current to flow in a predetermined direction through all of said polarized relays in response to the occurrence of the predetermined unbalanced condition within the system.

JAMES W. HODGKISS.

REFERENCES CITED

The following references are of record in the file of this patent:

UNITED STATES PATENTS

| Number | Name | Date |
|---|---|---|
| 1,849,830 | Gross | Mar. 15, 1932 |
| 1,950,193 | Ross | Mar. 6, 1934 |
| 2,096,614 | Lehmhaus | Oct. 19, 1937 |